Patented Aug. 6, 1946

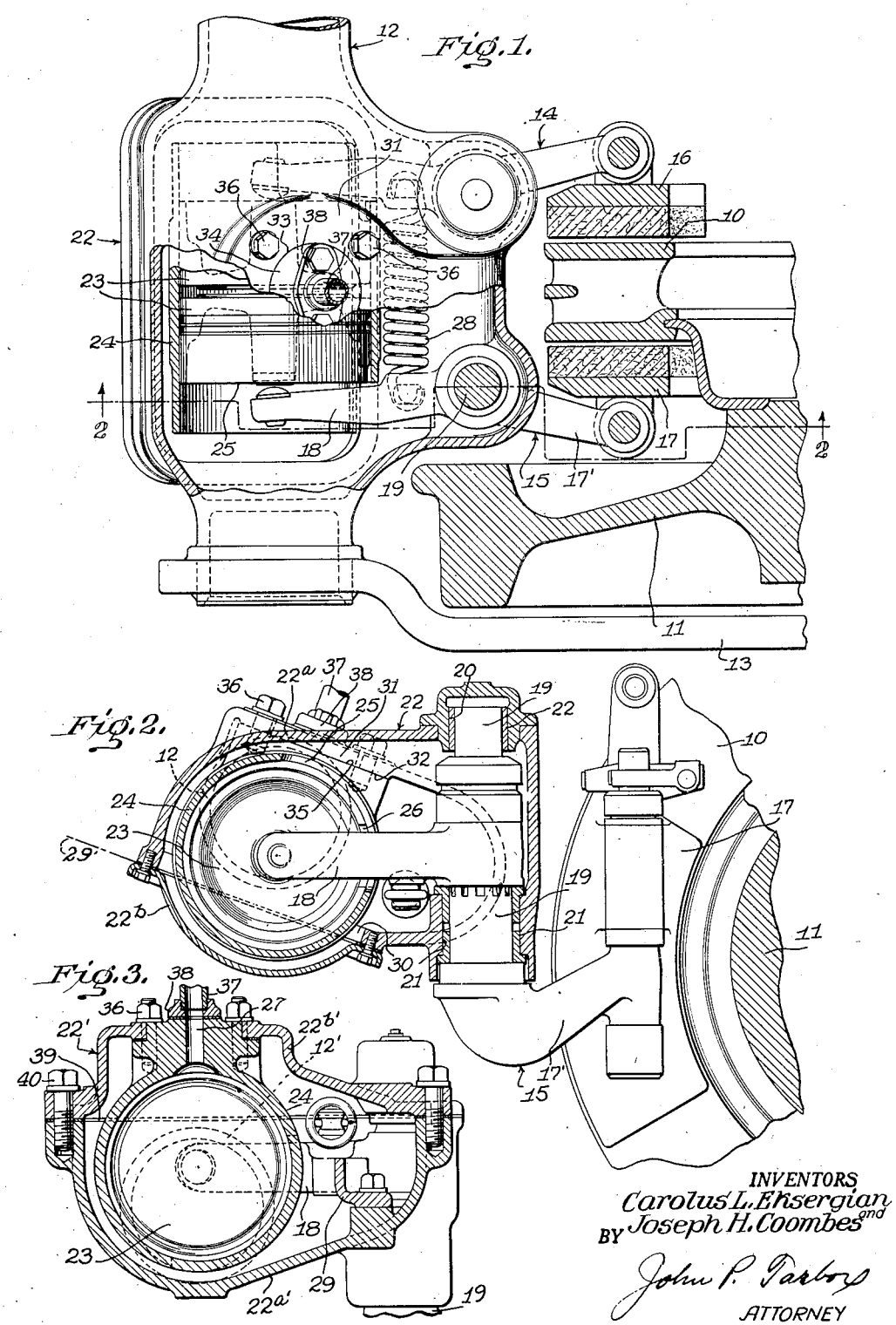

2,405,119

UNITED STATES PATENT OFFICE 2,405,119

BRAKE ARRANGEMENT

Carolus L. Eksergian and Joseph H. Coombes, Detroit, Mich., assignors to Budd Wheel Company, Philadelphia, Pa., a corporation of Pennsylvania Application January 29, 1944, Serial No. 520,210

4 Claims. (Cl. 188—153)

The invention relates to brake mechanisms and particularly to such mechanisms having a pair of brake levers mounted in a closed casing housing the brake cylinder actuator for said levers.

The invention is primarily concerned with the structure of the casing and the brake cylinder and the association of these parts to facilitate the fabrication thereof and provide ease of assembly and disassembly when desired. To facilitate the fabrication of the casing but still leave it as compact as possible, it is desirable to divide it into separable parts along a plane which intersects the cylinder. Accordingly, if the cylinder is made integral with one of the parts the machining of the seat through which said part engages the other part is rendered more time consuming and difficult.

It is, therefore, an object of the invention to overcome this difficulty by making the cylinder demountable from the part with which it is associated and to assemble it therewith only after the seat around its periphery has been machined.

It is also an object of the invention to associate the cylinder with the part with which it is demountably related in such fashion that ease of proper relative location of the parts is assured and a duct is provided for the fluid under pressure which is continuous without joint to the outside of the casing.

Other and further objects and the manner in which they are attained will become apparent from the following detailed description when read in connection with the drawing forming a part of this specification.

In the drawing:

Fig. 1 is a fragmentary view, parts being in horizontal section, showing the invention applied to a railway truck brake, Fig. 2 is a vertical sectional view taken substantially along the line 2—2 of Fig. 1, and Fig. 3 is a vertical sectional view through a modified structure, the section being taken centrally of the brake cylinder.

As shown in the drawing, the invention is applied to the type of brake shown in copending application, Serial No. 399,779, filed June 26, 1941, in which a brake rotor or disc, as 10, is secured to rotate with each wheel, as 11, of a wheel and axle assembly supporting a truck frame. The non-rotary brake parts are carried by a yoke including a transverse tubular member 12 supported centrally from the truck frame and at its ends having longitudinally extending arms, as 13, supported from the wheel and axle assembly.

At the transverse location of the rotor disc 10 the tubular transverse member is expanded, more particularly in fore and aft direction, to form a casing. In this casing are mounted at transversely space points, a pair of brake levers 14 and 15, said levers carrying the respective brake stators, in this case, segmental shoes 16 and 17 which are pivotally mounted on the respective levers by releasable pivot means forming no part of this invention and being generally similar to the means fully disclosed and claimed in copending application, Serial No. 529,730, filed April 16, 1944, now Patent #2,402,386, issued June 18, 1946.

Each lever, as 15, has offset arms 17' and 18 extending from the pivot portion 19 which is mounted in bearings 20 and 21 in the enlarged casing 22. The arms 17' carry the brake shoes and the arms 18 extend into the casing in operative engagement with the pistons 23 of the cylinder actuator 24. Cutaway portions, as 25, are provided in the ends of the cylinder and a narrow cutaway slot 26 is also provided in the pistons to enable these parts to clear the levers. The pistons are forced apart to apply the brakes through the admission of compressed air through a port 27, shown most clearly in the modified showing of Fig. 3, opening through the cylinder wall into the space between the pistons. A spring, as 28, interconnects the levers 14 and 15 to return the parts to the inoperative position shown in the figures, a suitable stop 29 (not shown except in the modification of Fig. 3) preventing the engagement of the arms 18 with the cylinder wall.

To facilitate the removal and insertion of the cylinder from and to the casing and to reduce the vertical height of the casing as much as possible, the casing is divided along a plane indicated by the line 29' (Fig. 2) inclined forwardly and downwardly so as to make an acute angle with the plane containing the lever axes. This line of cleavage divides the casing into an upper main portion 22a and a bottom cover portion 22b. For additional decrease in weight and to avoid machining it, the cover portion 22b is preferably formed as a stamping, as shown. In the final assembly the parts 22a and 22b are securely bolted together along their continuous mating seats, preferably with a gasket between them to form a tight joint.

The opening 30 within the seat on the casing part 22a is sufficiently large to permit the removal of the cylinder from the casing part in a downward and rearward direction, the cut out portions of the cylinder permitting the passage of the lever arms 18 in this movement.

Since the cylinder normally projects beyond the seat, this seat, which is required to be machined to make a tight joint with the cover portion, is difficult to machine with the cylinder in place in the casing. This offers a cogent reason for making the cylinder separable from the casing part 22a.

In the region of the central portion of the cylinder the top wall of the casing is inclined, as indicated at 31, similarly to the incline of the seat dividing the casing and formed with a machined seat 32 around an opening 33 through the wall. The cylinder is provided with a boss 34 (see Fig. 1) extending into the opening 33 and with a seat 35 around said boss mating the seat on the casing surrounding the opening. The cylinder is removably held to this seat by the screw bolts 36. The boss 34 on the cylinder 24 has a continuous port extending through it from the outside to the space between the pistons 23 and a flexible duct 37 for compressed fluid is attached by a fitting 38 to the boss to bring said duct in alignment with the port. Between the fitting and the boss is preferably inserted a gasket to provide a tight joint when the parts are bolted together. With this arrangement a continuous port extends without joints from the inside of the cylinder to the outside of the casing and the cylinder may be withdrawn from the casing for inspection or renewal of the pistons without disconnecting the flexible duct 37 leading to the cylinder. Of course, if a new cylinder is to be substituted, this can be readily done by disconnecting the detachable fitting 38 for the duct.

In the modification shown in Fig. 3, the transverse member is designated by 12', the enlarged casing by 22'. In this case the casing is divided in a plane, indicated by 39, at right angles to the vertical lever pivots 19 near the top of the casing leaving the lower part of the casing the main part 22a' and the upper part the cover part 22b'. The construction, as far as this invention is concerned, is generally similar to that already described and the same reference characters are used to designate like parts. However, in this case the cylinder 24 and cover 22b' are removed together by raising them vertically upwardly and the cylinder is removably associated with the cover in the same manner as the cylinder of the form already described is associated with the main casing. By making the cylinder removable from the cover the continuous peripheral seat of the cover, through which it is bolted by bolts 40 to a mating seat on the main casing, can be readily machined before the cylinder is assembled with it.

It will be seen then that substantially the same advantages accrue from the modified construction of Fig. 3 as result from the constructions of Figs. 1 and 2.

While several specific embodiments of the invention have been described herein in detail, it will be understood that changes and modifications may be made by those skilled in the art without departing from the main features of the invention, and such changes and modifications are intended to be covered in the appended claims.

What is claimed is:

1. In a brake arrangement, a rotary brake disc, a pair of non-rotary brake elements operatively associated with the opposite sides of said disc, and support means for said elements comprising a closed casing, a pair of brake levers operatively associated with the separate elements outside the casing and pivotally carried by the casing, and a removable cylinder actuator within the casing for actuating said levers, said casing being divided by a plane therethrough into separable main and cover portions and said cylinder actuator being demountably associated with the main portion of the casing and extending across said plane into the cover portion thereof.

2. A brake arrangement according to claim 1, in which the main casing portion is a casting with which the cylinder actuator is demountably associated and the cover portion is a stamping.

3. In a brake arrangement, a rotary brake disc, a pair of brake shoes operatively associated with the opposite sides of said disc, and support means for said shoes comprising a closed casing, a pair of brake levers pivoted in the casing and having one of their arms extending without the casing and carrying one of the respective shoes, and having another of their arms extending within the casing and a brake cylinder actuator mounted within the casing, the casing being divided along a plane inclined to the plane passing through the axes of said levers into an upper main portion and a lower cover portion, the opening closed by said cover portion permitting the passage of the cylinder actuator therethrough, and said cylinder actuator being demountably secured to one of said casing portions and extending across said plane into the other of said portions.

4. In a brake arrangement, a brake support including a casing having pivotally mounted therein a pair of brake levers carrying respective brake shoes outside the casing, a removable cylinder actuator within the casing for actuating said levers, the casing being divided along a plane paralleling the cylinder axis into a main casing part and a cover part removably secured together, an opening in said main part surrounded by a mounting seat, the cylinder actuator having a central boss arranged to fit said opening and a seat surrounding said boss arranged to fit said mounting seat, and means demountably securing said cylinder to the mounting seat with its boss projecting into said opening and the cylinder extending across said plane into the cover part of the casing.

CAROLUS. L. EKSERGIAN.
JOSEPH H. COOMBES.